(12) United States Patent
Kashyap et al.

(10) Patent No.: US 12,640,840 B2
(45) Date of Patent: May 26, 2026

(54) TWO-SIDED MODEL-BASED COMMUNICATION FUNCTIONALITY

(71) Applicant: Nokia Technologies Oy, Espoo (FI)

(72) Inventors: Bharath Ramesh Kashyap, Bangalore (IN); Fahad Syed Muhammad, Orsay (FR); Dimitri Gold, Espoo (FI); Jee Hyun Kim, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 110 days.

(21) Appl. No.: 18/806,964

(22) Filed: Aug. 16, 2024

(65) Prior Publication Data

US 2025/0062858 A1    Feb. 20, 2025

(30) Foreign Application Priority Data

Aug. 18, 2023    (IN) .............................. 202341055557

(51) Int. Cl.
H04L 1/00 (2006.01)
G06N 20/00 (2019.01)
H04L 5/00 (2006.01)

(52) U.S. Cl.
CPC ........... H04L 1/0042 (2013.01); G06N 20/00 (2019.01); H04L 5/0055 (2013.01)

(58) Field of Classification Search
CPC ....... H04L 1/0042; H04L 1/0067; H04L 1/24; H04W 24/08; H04W 24/10; G06N 3/02; G06N 3/08; G06N 3/0455; G06N 20/00
See application file for complete search history.

(56) References Cited

U.S. PATENT DOCUMENTS

| | | | | |
|---|---|---|---|---|
| 2024/0137884 A1* | 4/2024 | Bai | ........................ | G06N 20/00 |
| 2024/0152752 A1* | 5/2024 | Subrahmanya | .......... | G06N 3/08 |

FOREIGN PATENT DOCUMENTS

| | | | | |
|---|---|---|---|---|
| WO | WO-2024176207 A1 * | 8/2024 | ............. | G06N 3/045 |

OTHER PUBLICATIONS

Guo et al., AI for CSI feedback enhancement in 5G advanced, IEEE, pp. 1 to 8. (Year: 2022).*

* cited by examiner

*Primary Examiner* — Shelly A Chase

(74) *Attorney, Agent, or Firm* — Barta Jones, PLLC

(57) ABSTRACT

Embodiments of the present disclosure relate to apparatuses, methods, devices and computer readable storage medium for two-sided model-based communication functionality. In a method, a first apparatus obtains a reference data set of a communication functionality. The reference data set includes reference data associated with a plurality of terminal devices, a plurality of network devices and at least one test equipment. The first apparatus updates a reference encoder of the communication functionality based on at least the reference data. The first apparatus updates a reference decoder of the communication functionality based on at least the reference data. At least one of the updated reference encoder or the updated reference decoder is used for optimization of the communication functionality by a further apparatus.

20 Claims, 7 Drawing Sheets

200

NW-SIDE MODEL TRAINING PHASE 210

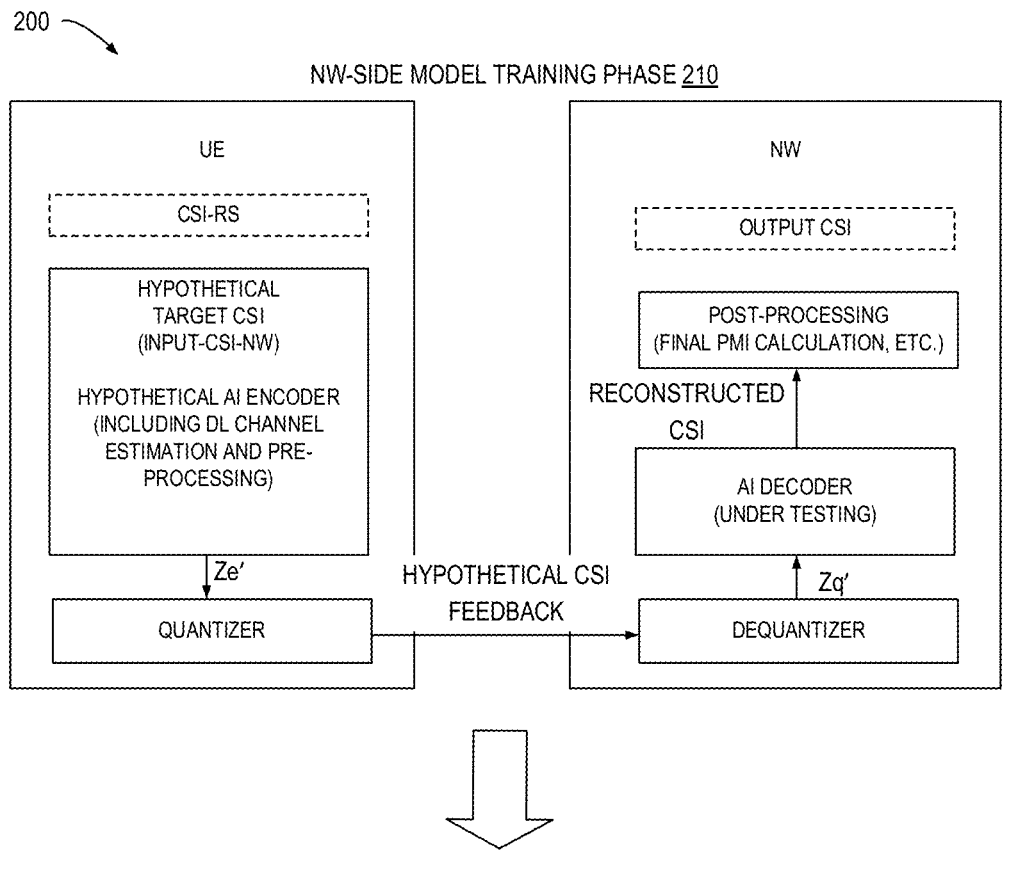

UE

CSI-RS

HYPOTHETICAL
TARGET CSI
(INPUT-CSI-NW)

HYPOTHETICAL AI ENCODER
(INCLUDING DL CHANNEL
ESTIMATION AND PRE-
PROCESSING)

$Ze'$

QUANTIZER

HYPOTHETICAL CSI
FEEDBACK

NW

OUTPUT CSI

POST-PROCESSING
(FINAL PMI CALCULATION, ETC.)

RECONSTRUCTED
CSI

AI DECODER
(UNDER TESTING)

$Zq'$

DEQUANTIZER

UE-SIDE MODEL TRAINING PHASE 250

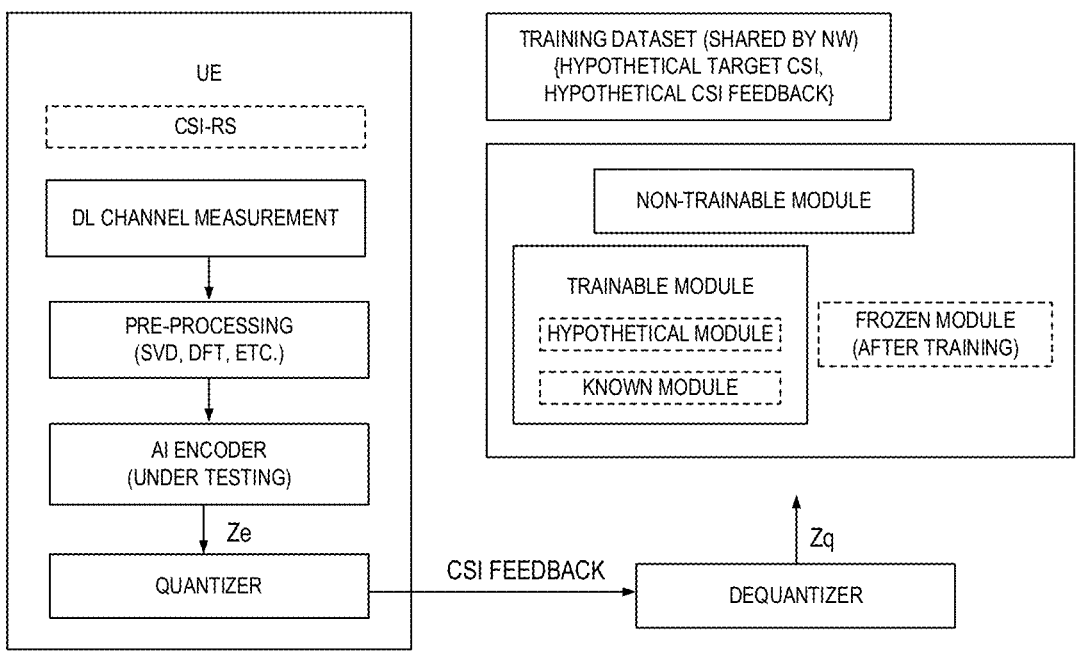

UE

CSI-RS

DL CHANNEL MEASUREMENT

PRE-PROCESSING
(SVD, DFT, ETC.)

AI ENCODER
(UNDER TESTING)

$Ze$

QUANTIZER

CSI FEEDBACK

TRAINING DATASET (SHARED BY NW)
{HYPOTHETICAL TARGET CSI,
HYPOTHETICAL CSI FEEDBACK}

NON-TRAINABLE MODULE

TRAINABLE MODULE

HYPOTHETICAL MODULE

KNOWN MODULE

FROZEN MODULE
(AFTER TRAINING)

$Zq$

DEQUANTIZER

FIG. 2

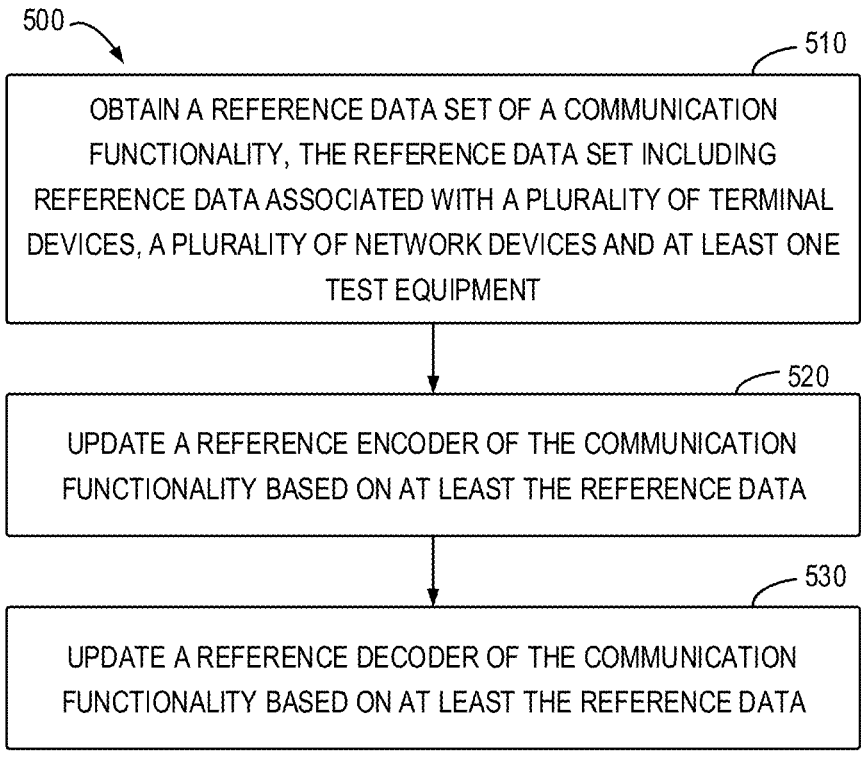

OBTAIN A REFERENCE DATA SET OF A COMMUNICATION FUNCTIONALITY, THE REFERENCE DATA SET INCLUDING REFERENCE DATA ASSOCIATED WITH A PLURALITY OF TERMINAL DEVICES, A PLURALITY OF NETWORK DEVICES AND AT LEAST ONE TEST EQUIPMENT

UPDATE A REFERENCE ENCODER OF THE COMMUNICATION FUNCTIONALITY BASED ON AT LEAST THE REFERENCE DATA

UPDATE A REFERENCE DECODER OF THE COMMUNICATION FUNCTIONALITY BASED ON AT LEAST THE REFERENCE DATA

FIG. 5

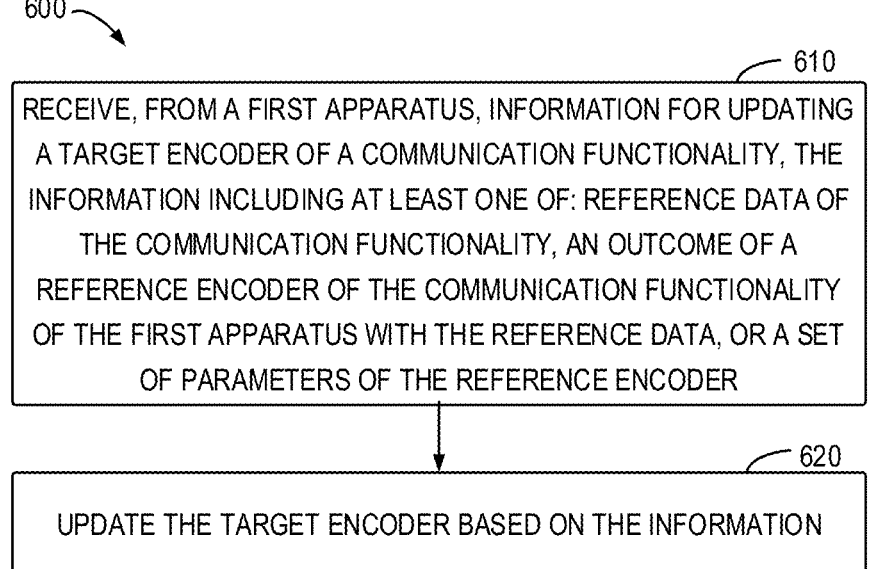

RECEIVE, FROM A FIRST APPARATUS, INFORMATION FOR UPDATING A TARGET ENCODER OF A COMMUNICATION FUNCTIONALITY, THE INFORMATION INCLUDING AT LEAST ONE OF: REFERENCE DATA OF THE COMMUNICATION FUNCTIONALITY, AN OUTCOME OF A REFERENCE ENCODER OF THE COMMUNICATION FUNCTIONALITY OF THE FIRST APPARATUS WITH THE REFERENCE DATA, OR A SET OF PARAMETERS OF THE REFERENCE ENCODER

UPDATE THE TARGET ENCODER BASED ON THE INFORMATION

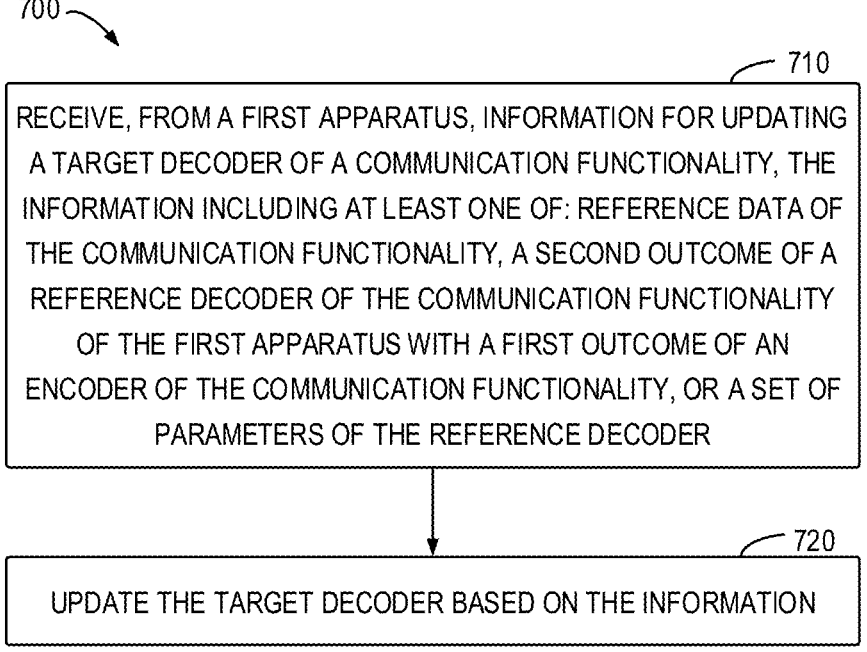

710

RECEIVE, FROM A FIRST APPARATUS, INFORMATION FOR UPDATING A TARGET DECODER OF A COMMUNICATION FUNCTIONALITY, THE INFORMATION INCLUDING AT LEAST ONE OF: REFERENCE DATA OF THE COMMUNICATION FUNCTIONALITY, A SECOND OUTCOME OF A REFERENCE DECODER OF THE COMMUNICATION FUNCTIONALITY OF THE FIRST APPARATUS WITH A FIRST OUTCOME OF AN ENCODER OF THE COMMUNICATION FUNCTIONALITY, OR A SET OF PARAMETERS OF THE REFERENCE DECODER

720

UPDATE THE TARGET DECODER BASED ON THE INFORMATION

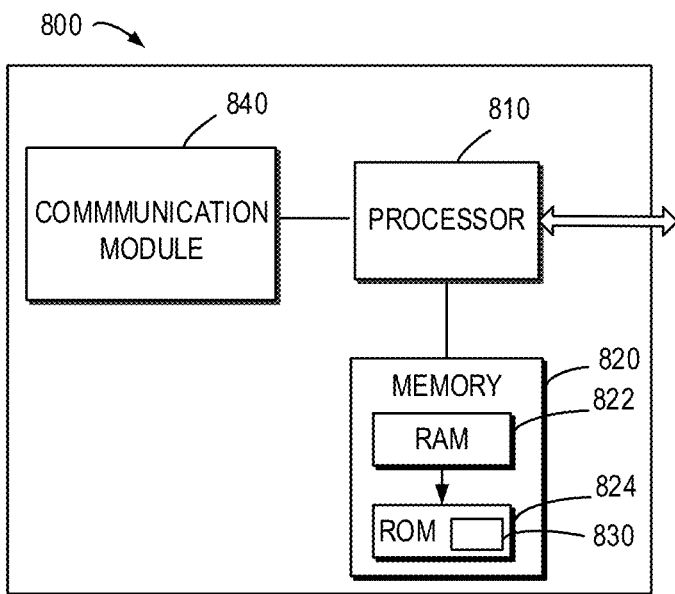

840

810

COMMMUNICATION MODULE

PROCESSOR 820
822

MEMORY

RAM

824

830

ROM

FIG. 8

TWO-SIDED MODEL-BASED COMMUNICATION FUNCTIONALITY

FIELDS

Various example embodiments of the present disclosure generally relate to the field of telecommunication and in particular, to apparatuses, methods, devices and computer readable storage medium for two-sided model-based communication functionality.

BACKGROUND

Several technologies have been proposed to improve communication performances. For example, communication devices may employ an artificial intelligence (AI)/ML model to improve communication qualities. The AI/ML model can be applied to different communication functionality in different scenarios. In some cases, two-sided AI/ML model-based communication functionality is proposed. For example, a user equipment (UE) side encoder and a network (NW) side decoder may be used for the communication functionality. Performances of the two-sided model-based communication functionality are an importance issue.

SUMMARY

In a first aspect of the present disclosure, there is provided a first apparatus. The first apparatus comprises at least one processor; and at least one memory storing instructions that, when executed by the at least one processor, cause the first apparatus to: obtain a reference data set of a communication functionality, the reference data set including reference data associated with a plurality of terminal devices, a plurality of network devices and at least one test equipment; update a reference encoder of the communication functionality based on at least the reference data; and update a reference decoder of the communication functionality based on at least the reference data, wherein at least one of the updated reference encoder or the updated reference decoder is used for optimization of the communication functionality by a further apparatus.

In a second aspect of the present disclosure, there is provided a second apparatus. The second apparatus comprises at least one processor; and at least one memory storing instructions that, when executed by the at least one processor, cause the second apparatus to: receive, from a first apparatus, information for updating a target encoder of a communication functionality, the information including at least one of: reference data of the communication functionality, an outcome of a reference encoder of the communication functionality of the first apparatus with the reference data, or a set of parameters of the reference encoder; and update the target encoder based on the information.

In a third aspect of the present disclosure, there is provided a third apparatus. The third apparatus comprises at least one processor; and at least one memory storing instructions that, when executed by the at least one processor, cause the third apparatus to: receive, from a first apparatus, information for updating a target decoder of a communication functionality, the information including at least one of: reference data of the communication functionality, a second outcome of a reference decoder of the communication functionality of the first apparatus with a first outcome of an encoder of the communication functionality, or a set of parameters of the reference decoder; and update the target decoder based on the information.

In a fourth aspect of the present disclosure, there is provided a method. The method comprises: obtaining, at a first apparatus, a reference data set of a communication functionality, the reference data set including reference data associated with a plurality of terminal devices, a plurality of network devices and at least one test equipment; updating a reference encoder of the communication functionality based on at least the reference data; and updating a reference decoder of the communication functionality based on at least the reference data, wherein at least one of the updated reference encoder or the updated reference decoder is used for optimization of the communication functionality by a further apparatus.

In a fifth aspect of the present disclosure, there is provided a method. The method comprises: receiving, at a second apparatus from a first apparatus, information for updating a target encoder of a communication functionality, the information including at least one of: reference data of the communication functionality, an outcome of a reference encoder of the communication functionality of the first apparatus with the reference data, or a set of parameters of the reference encoder; and updating the target encoder based on the information.

In a sixth aspect of the present disclosure, there is provided a method. The method comprises: receiving, at a third apparatus from a first apparatus, information for updating a target decoder of a communication functionality, the information including at least one of: reference data of the communication functionality, a second outcome of a reference decoder of the communication functionality of the first apparatus with a first outcome of an encoder of the communication functionality, or a set of parameters of the reference decoder; and updating the target decoder based on the information.

In a seventh aspect of the present disclosure, there is provided a first apparatus. The first apparatus comprises means for obtaining a reference data set of a communication functionality, the reference data set including reference data associated with a plurality of terminal devices, a plurality of network devices and at least one test equipment; means for updating a reference encoder of the communication functionality based on at least the reference data; and means for updating a reference decoder of the communication functionality based on at least the reference data, wherein at least one of the updated reference encoder or the updated reference decoder is used for optimization of the communication functionality by a further apparatus.

In an eighth aspect of the present disclosure, there is provided a second apparatus. The second apparatus comprises means for receiving, from a first apparatus, information for updating a target encoder of a communication functionality, the information including at least one of: reference data of the communication functionality, an outcome of a reference encoder of the communication functionality of the first apparatus with the reference data, or a set of parameters of the reference encoder; and means for updating the target encoder based on the information.

In a ninth aspect of the present disclosure, there is provided a third apparatus. The third apparatus comprises means for receiving, from a first apparatus, information for updating a target decoder of a communication functionality, the information including at least one of: reference data of the communication functionality, a second outcome of a reference decoder of the communication functionality of the first apparatus with a first outcome of an encoder of the communication functionality, or a set of parameters of the reference decoder; and means for updating the target decoder based on the information.

In a tenth aspect of the present disclosure, there is provided a computer readable medium. The computer readable medium comprises instructions stored thereon for causing an apparatus to perform at least the method according to the fourth, the fifth, or the sixth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 2 illustrates an example framework for training the two-sided model for a communication functionality;

FIG. 5 illustrates a flowchart of a method implemented at a first apparatus according to some example embodiments of the present disclosure;

FIG. 6 illustrates a flowchart of a method implemented at a second apparatus according to some example embodiments of the present disclosure;

FIG. 7 illustrates a flowchart of a method implemented at a third apparatus according to some example embodiments of the present disclosure;

FIG. 8 illustrates a simplified block diagram of a device that is suitable for implementing example embodiments of the present disclosure.

Throughout the drawings, the same or similar reference numerals represent the same or similar element.

DETAILED DESCRIPTION

Figure 1:
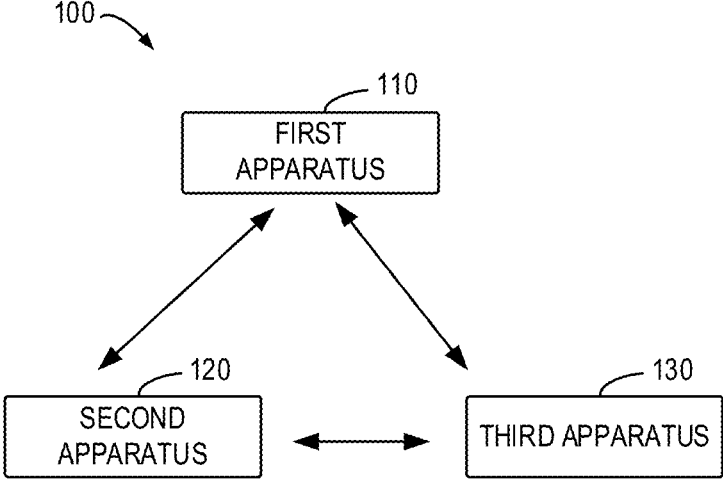
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (cNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As used herein, the term "AI/ML model" may refer to a data driven algorithm that applies AI/ML techniques to generate a set of outputs based on a set of inputs. In the context of the present disclosure, the term "AI/ML model" may be used interchangeably with the terms "model", "AI model" and "ML model". The term "AI/ML" may be used interchangeably with the terms "AI" and "ML".

As described above, AI/ML for New Radio (NR) air interface is now studied in 3rd Generation Partnership Project (3GPP). One of the objectives of the study is to cover the interoperability and testability aspect of the newly defined AI/ML enabled features.

In some mechanisms, work regarding the interoperability and testability aspects is started after there is sufficient progress on use case study in radio access network (RAN)1 and RAN2. Requirements and testing frameworks are intended to validate AI/ML based performance enhancements and ensuring that UE and gNB with AI/ML meet or exceed the existing minimum requirements if applicable. The need and implications for AI/ML processing capabilities definition may be considered.

The AI/ML based communication functionality may be used for different use cases. For example, the AI/ML based communication functionality may be an AI/ML enabled channel state information (CSI) feedback enhancement, which may also be referred to as an AI/ML based CSI feedback use case. This use case is a potential use case to be selected for release 19 work item on AI/ML.

In some mechanism, a two-sided model-based CSI feedback enhancement is proposed. By way of example, CSI compression is one of the sub-use cases of the two-sided model-based CSI feedback enhancement. The CSI compression includes AI/ML-based encoding of CSI feedback (e.g., of the channel matrix, channel matrix eigenvalues or Rel-17 Type II W2 coefficients) at the UE side and decoding it with a matching AI/ML model at the NW side. Since there are two components: UE-side encoder and NW-side decoder, such models may be referred to as "two-sided models" or "two-sided model".

There are several approaches for training of such two-sided models. The training of the two-sided model may be referred to as training collaborations for the two-sided models. In one approach (also referred to as Type 1 training or Type 1 joint training), the encoder and the decoder may be jointly trained by a single entity or a single side such as UE side or network side. In another approach, (also referred to as Type 2 training or Type 21 joint training), the encoder and the decoder may be jointly trained at UE and network, respectively. In a further approach (also referred to as Type 3 training or separate training), the encoder and the decoder may be separately trained at the network side and the UE side. For example, the UE-side CSI generation part and the network-side CSI reconstruction part are trained by UE side and network side, respectively. It is to be understood that any other suitable collaboration training types are not excluded.

As used herein, joint training means the generation model and reconstruction model should be trained in the same loop for forward propagation and backward propagation. Joint training may be done both at single node or across multiple nodes (e.g., through gradient exchange between nodes).

As used herein, separate training includes sequential training starting with UE side training, or sequential training starting with NW side training, or parallel training at UE and NW.

For the Type 3 training, separate or sequential training is becoming a candidate acceptable for most companies. In Type 3, there are possibilities of either training the UE side first or the NW side first. In case of the UE-first separate training, NW vendors need to handle multiple UE-side (encoder) models, whereas UE vendors may focus on single (or only a few) encoder model(s). In case of the NW-first separate training, UE vendors need to handle multiple NW-side (decoder) models, whereas NW vendors may focus on single (or only a few) decoder model(s).

As two-sided CSI compression is one of the selected sub use cases. Therefore, testing mechanism for two sided models and encoder/decoder design in RAN4 is a topic of very high interest in the 3GPP.

In some mechanisms (referred to as Option 1), a reference decoder is provided by the vendor of the encoder under test so that the encoder and decoder are jointly designed and trained. Alternatively, in some mechanisms (referred to as Option 2), a reference decoder is provided by the vendor of the decoder (infra-vendors) so that the encoder and decoder are jointly designed and trained.

In some mechanisms (referred to as Option 3), the reference decoder(s) are fully specified and captured in RAN4 spec to ensure identical implementation across equipment vendors without additional training procedure needed. Alternatively, in some mechanisms (referred to as Option 4), the reference decoder(s) are partially specified and captured in RAN4 spec.

In some mechanisms (referred to as Option 6), a test decoder is specified and captured in RAN4 and is provided by test environment vendor. The encoder and decoder can be jointly trained.

It is to be understood that other mechanisms or other options are not precluded.

In some mechanisms, principles/conditions for RAN4 specified decoder/encoder (for Options 3 and 4, 6) may be designed. If two-sided model is to be used in the WI phase, RAN4 should take into account complexity limitations based on e.g., feasibility of test equipment (TE) implementation and complexity levels considered feasible by network vendors/UE vendors for decoder/encoder deployment.

In some mechanisms, RAN4's choice of test decoder/encoder should aim as much as possible to avoid limiting the implementation choices, including e.g., complexity, backbone model etc., of UE/gNB encoders/decoders operating in the field.

As per the ongoing discussions in RAN1 and RAN4, for a test framework, it is desirable to have a reference encoder or decoder that is agreeable to both the UE and the network vendors that when used in a test setup can guarantee reasonable performance. At the same time does not reveal the inherent details of the design of the encoders and decoders.

According to some example embodiments of the present disclosure, there is provided a solution for two-sided model-based communication functionality. In this solution, a first apparatus (such as a test equipment (TE)) obtains a reference data set of a communication functionality. The reference data set includes reference data associated with a plurality of terminal devices, a plurality of network devices and at least one test equipment. The first apparatus updates a reference encoder and a reference decoder of the communication functionality based on at least the reference data. For example, the first apparatus may create the reference encoder or the reference decoder. The created reference encoder or reference decoder may be further updated. At least one of the updated reference encoder or updated reference decoder is used for optimization of the communication functionality by a further apparatus. For example, the further apparatus may be a terminal device, a network device, or a TE.

In the way, the communication functionality can be optimized. For example, an encoder or a decoder for the communication functionality of the further apparatus can be updated. For another example, the reference decoder or the reference encoder may also be used for testing the encoder or decoder of the further apparatus.

Example embodiments of the present disclosure will be described in detail below with reference to the accompanying drawings.

FIG. 1 illustrates an example communication environment 100 in which example embodiments of the present disclosure may be implemented. As shown in FIG. 1, the communication network 100 may include a first apparatus 110, a second apparatus 120 and a third apparatus 130. The first apparatus 110 may communicate with the second apparatus 120 and the third apparatus 130. The second apparatus 120 and the third apparatus 130 may also communicate with each other.

Two-sided AI/ML models (also referred to as "two-sided models") may be deployed at the second apparatus 120 and the third apparatus 130. The two-sided AI/ML models may be used for any suitable use cases or to implement any suitable communication functionalities, for example but not limited to, channel state information (CSI) feedback enhancement, etc. For example, an encoder (for example an AI/ML encoder) of a communication functionality may be deployed at the second apparatus 120 or included in the second apparatus 120. A decoder (for example an AI/ML decoder) of the communication functionality may be deployed at the third apparatus 130 or included in the third apparatus 130. The encoder of the second apparatus 120 and the decoder of the third apparatus 130 may be collectively referred to as the two-sided models or two-sided AI/ML models.

It is to be understood that the number of first apparatus, second apparatus and third apparatus shown in FIG. 1 is given for the purpose of illustration without suggesting any limitations. The communication network 100 may include any suitable number of second apparatus and first apparatus.

In some example embodiments, the first apparatus 110 may include a test equipment (TE). The second apparatus 120 may include a device under test (DUT) such as a terminal device. The third apparatus 130 may include a DUT such as a network device. For example, an AI/ML model may be implemented at the second apparatus 120.

As used herein, the term "communication functionality" may refer to a functionality or service provided by the AI/ML model such as the two-sided models. The term "communication functionality" may also be referred to as a "AI/ML based functionality" or "AI/ML enabled functionality" or "AI/ML based use case". In some example embodiments, the AI/ML model at the second apparatus 120 and the third apparatus 130 may need to be updated or tested. In other words, the communication functionality may need to be updated or tested.

In the following, for the purpose of illustration, some example embodiments are described with the first apparatus 110 operating as a TE, the second apparatus 120 operating as a terminal device and the third apparatus 130 operating as a network device. However, in some example embodiments, operations described in connection with a TE may be implemented at a terminal device or network device or other devices, operations described in connection with a terminal device may be implemented at a network device or other device, and operations described in connection with a network device may be implemented at a terminal device or other device.

In some example embodiments, if the third apparatus 130 is a network device and the second apparatus 120 is a terminal device, a link from the second apparatus 120 to the third apparatus 130 is referred to as an uplink (UL), and a link from the third apparatus 130 to the second apparatus 120 is referred to as a downlink (DL). In UL, the second apparatus 120 is a transmitting (TX) device (or a transmitter) and the third apparatus 130 is a receiving (RX) device (or a receiver). In DL, the third apparatus 130 is a TX device (or a transmitter) and the second apparatus 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

FIG. 2 illustrates an example framework 200 for training the two-sided model for a communication functionality. It is assumed that the training in FIG. 2 is a NW first separate training. For purpose of illustration, the communication functionality illustrated with respect to FIG. 2 is CSI feedback or CSI compression.

As illustrated, the separate training includes a NW-side model training phase 210 and a UE-side model training phase 250. Here, the AI decoder at the NW side is trained first, NW vendor needs to assume an AI encoder model at the UE side when its NW side AI decoder is being trained together with the corresponding hypothetical AI encoder (the training phase 210). At this NW-side model training phase 210, the input at the hypothetical AI encoder of UE side (which is assumed at NW side) is termed as "input-CSI-NW" in 3GPP. This may be considered as "hypothetical target CSI" in the sense that "hypothetical" as it is based on NW-assumed pre-AIML chain operation at UE, i.e., channel estimation, pre-processing like singular value decomposition (SVD), etc., and "target CSI" as this is the one which AI decoder at NW-side should aim to reconstruct from the hypothetical CSI feedback (dequantized hypothetical latent vector). Be aware that the hypothetical target CSI may deviate from the actual target CSI at the real UE to some degree, as it depends on UE implementation specific properties like antenna imbalance, radio frequency integrated circuit (RFIC) characteristics, radio frequency (RF) non-linearity, baseband (BB) DL channel measurement algorithms, specific implementation practice of SVD, etc.

However, for the framework 200, it is desirable to have a reference encoder or decoder that is agreeable to both the UE and the network vendors that when used in a test setup can guarantee reasonable performance. At the same time does not reveal the inherent details of the design of the encoders and decoders.

According to some example embodiments of the present disclosure, the first apparatus 110 (such as a test equipment (TE)) obtains a reference data set of a communication functionality. The reference data set includes reference data associated with a plurality of terminal devices, a plurality of network devices and at least one test equipment. The first apparatus 110 updates a reference encoder and a reference decoder of the communication functionality based on at least the reference data. At least one of the updated reference encoder or updated reference decoder is used for optimization of the communication functionality by a further apparatus. For example, the further apparatus may be a terminal device, a network device, or a TE.

In the way, the communication functionality can be optimized. For example, an encoder or a decoder for the communication functionality of the further apparatus can be updated. For another example, the reference decoder or the reference encoder may also be used for testing the encoder or decoder of the further apparatus.

Figure 3:
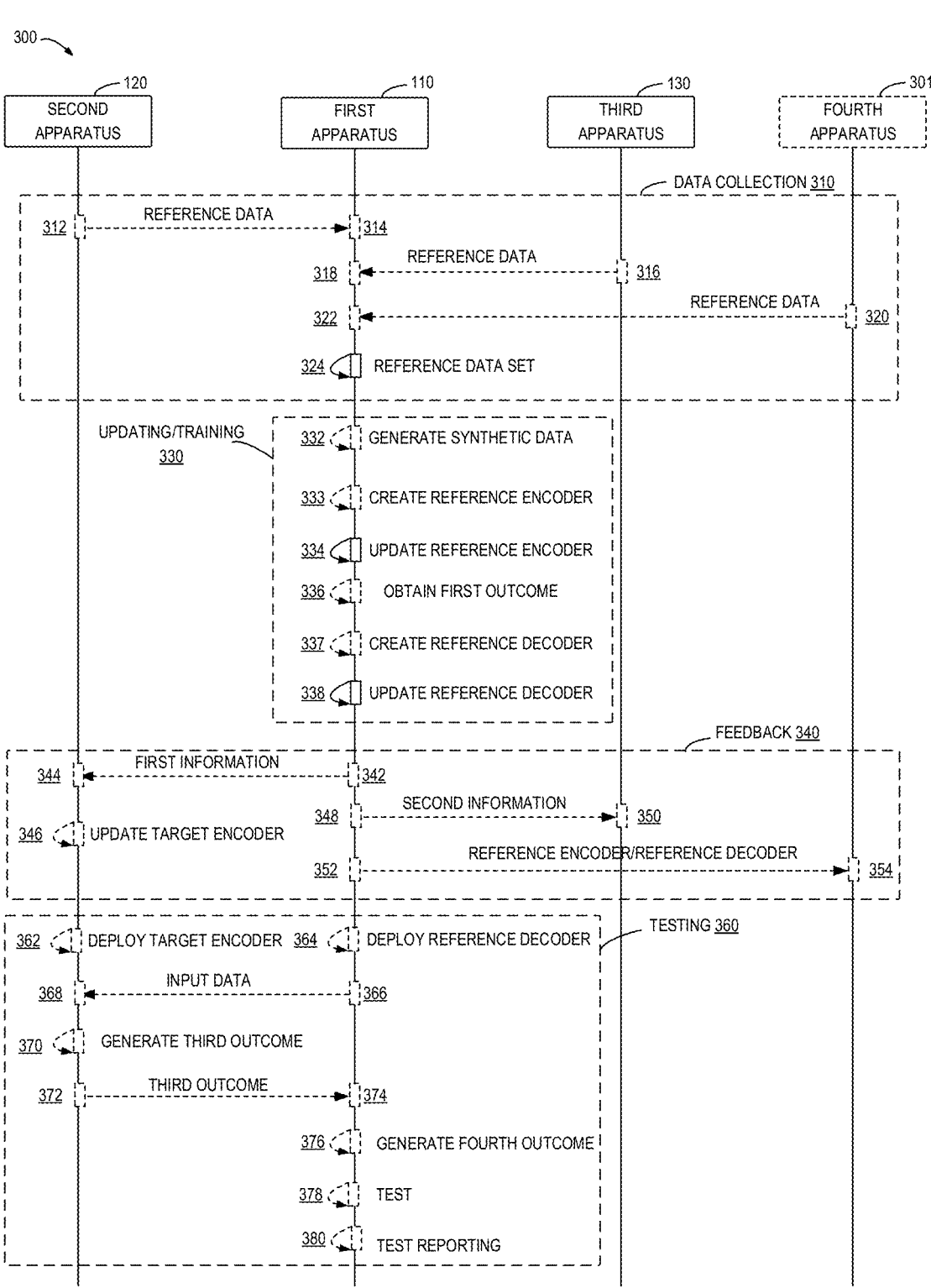
FIG. 3 illustrates an example signaling chart for two-sided model-based communication functionality according to some example embodiments of the present disclosure.

Reference is now made to FIG. 3, which illustrates a signaling chart 300 for two-sided model-based communication functionality according to some example embodiments of the present disclosure. As shown in FIG. 3, the signaling chart 300 involves the first apparatus 110, the second apparatus 120, the third apparatus 130 in FIG. 1 and an optional fourth apparatus 301. The fourth apparatus 301 may be a TE or any other suitable device.

The signaling chart 300 may be applicable for any suitable AI/ML use cases or any suitable communication functionalities. For example, various communication functionalities may include but not limited to CSI feedback enhancement, beam management, positioning, etc. In the following, some example embodiments are described by taking the CSI feedback as an example. However, it is to be understood that this is merely an example without any limitation, and the concept described with respect the CSI feedback may be applied to another AI/ML based communication functionalities or use cases.

It is to be understood that although a single first apparatus 110, a single second apparatus 120, a single third apparatus 130 and a single optional fourth apparatus 301 are illustrated in FIG. 3, it would be appreciated that there may be a plurality of apparatuses performing similar operations as described with respect to the first apparatus 110, the second apparatus 120, the third apparatus 130 or the fourth apparatus 301 below.

As shown in FIG. 3, the signaling chart 300 includes a data collection process 310. In the data collection process 310, the first apparatus 110 obtains (324) a reference data set of a communication functionality. As used herein, the term "reference data set" may also be referred to as a "training dataset". The term "reference data" may also be referred to as "training data". The reference data set includes reference data associated with a plurality of terminal devices, a plurality of network devices and at least one test equipment. In some example embodiments, various apparatuses such as UE vendors or NW vendors share the data that may be used for training at the first apparatus 110. The TE vendors may also share the data.

By way of example, the second apparatus 120 may transmit (312) reference data to the first apparatus 110. The third apparatus 130 may transmit (316) reference data to the first apparatus 110. The fourth apparatus 301 may transmit (320) reference data to the first apparatus 110. The first apparatus 301 may receive (314/318/322) the reference data from the second apparatus 120, the third apparatus 130 or the fourth apparatus 301.

The first apparatus 110 may store the received (314/318/322) reference data in the reference data set. For example, the reference data from various sources may be stored in a data repository communicatively connected to the first apparatus 110 or included in the first apparatus 110.

The first apparatus 110 may perform an updating or training process 330 based on the reference data set. The first apparatus 110 may create (333) or generate a reference encoder of the communication functionality based on at least the reference data. For example, the reference encoder may cater to different decoders of the third apparatus 130. The reference encoder may be created (333) or designed in agreement with all the state holders. The design and characteristics of the reference encoder may be fully or partially specified by 3GPP or any other standardization bodies.

Alternatively, in some example embodiments, the first apparatus 110 may not create the reference encoder, instead the first apparatus 110 may receive a set of parameters of the reference encoder from the fourth apparatus 301 or from any other suitable apparatus. The first apparatus 110 may alternatively receive the set of parameters of the reference encoder from the data repository.

In some example embodiments, the first apparatus 110 may generate (332) synthetic data based on the reference data. The first apparatus 110 may create (333) the reference encoder based on the synthetic data.

In some example embodiments, various aspects of the data (e.g., minimum set of parameters that may be used across data sets from various sources) that may be used to train the models (the encoder and/or the decoder) are specified (fully or partially) by the 3GPP or any other standardization bodies. Based on those aspects and other mutual agreements between the stake holders, synthetic data may be generated from the latest data sets available in the data repository.

The first apparatus 110 update (334) the reference encoder of the communication functionality based on at least the reference data. For example, the first apparatus 110 may partially or fully train the reference encoder, or fine-tune, refine, or retrain the reference encoder. In some example embodiments, the reference encoder may be a hypothetical encoder.

It is to be understood that in some example embodiments, if the created (333) reference encoder is well created (or well trained), the updating (334) of the reference encoder may be optionally. As used herein, the term "updating an encoder" may refer to "determining parameters of a created encoder" or "updating parameters of an existing or trained encoder". As used herein, the term "updated reference encoder" may also refer to a well created reference encoder without updating, or refer to a "partially or fully trained encoder", a "refined or retrained encoder", or a "fine-tuned encoder".

Likewise, the first apparatus 110 may create (337) or generate a reference decoder of the communication functionality based on at least the reference data. For example, the reference decoder may be created from scratch. In some example embodiments, the first apparatus 110 may create (337) the reference decoder based on the synthetic data. For example, the reference decoder may cater to different encoders designed by individual UE vendors. The reference decoder may be created (337) or designed in agreement with all the state holders. The design and characteristics of the reference decoder may be fully or partially specified by 3GPP or any other standardization bodies.

Alternatively, in some example embodiments, the first apparatus 110 may not create the reference decoder, instead the first apparatus 110 may receive a set of parameters of the reference decoder from the fourth apparatus 301 or from any other suitable apparatus. The first apparatus 110 may alternatively receive the set of parameters of the reference decoder from the data repository.

The first apparatus 110 update (338) the reference decoder of the communication functionality based on at least the reference data. For example, the first apparatus 110 may partially or fully train the reference decoder, or fine-tune, refine, or retrain the reference decoder. In some example embodiments, the reference encoder may be a hypothetical decoder. Such updated reference decoder may cater to different encoders.

It is to be understood that in some example embodiments, if the created (337) reference decoder is well created (or well trained), the updating (338) of the reference decoder may be optionally. As used herein, the term "updating a decoder" may refer to "determining parameters of a created decoder" or "updating parameters of an existing or trained decoder". As used herein, the term "updated reference decoder" may also refer to a well created reference decoder without updating, or refer to a "partially or fully trained decoder", a "refined or retrained decoder", or a "fine-tuned decoder".

At least one of the updated (334) reference encoder or the updated (338) reference decoder is used for optimization of the communication functionality by a further apparatus such as the second apparatus 120, the third apparatus 130, or the fourth apparatus 301.

In some example embodiments, the first apparatus 110 may obtain (336) a first outcome of the updated reference encoder of the communication functionality with the reference data. The first apparatus 110 may update (338) the reference decoder of the communication functionality based on the first outcome and the reference data. Taking the CSI feedback as an example of the communication functionality, the first outcome may be CSI feedback such as hypothetical CSI feedback.

In some example embodiments, the signaling chart 300 may include a feedback process 340. In the feedback process 340, the first apparatus 110 may transmit (342) first information for updating a target encoder of the communication functionality to the second apparatus 120. The second apparatus 120 may receive (344) the first information. The first information may include at least one of: the reference data, the first outcome, or a first set of parameters of the updated reference encoder. In this way, the training set used to train the reference encoder as well as the hypothetical CSI feedback is shared with the UE vendors.

In response to receiving (344) the first information, the second apparatus 120 may update (346) a target encoder of the communication functionality. For example, the second apparatus 120 may train, retrain or refine the target encoder. As used herein, the target encoder may also be referred to as a real encoder.

In the feedback process 340, the first apparatus 110 may transmit (348) second information for updating a target decoder of the communication functionality to the third apparatus 130. The third apparatus 130 may receive (350) the second information. The second information may include at least one of: the reference data, a second outcome of the updated reference decoder of the communication functionality with the first outcome, or a second set of parameters of the updated reference decoder. In the example embodiments where the first outcome includes hypothetical CSI feedback, the second outcome may include reconstructed CSI feedback.

In this way, the training set used to train the reference decoder as well as the reconstructed CSI feedback is shared with the NW vendors. The third apparatus 130 may update a target decoder or a real decoder of the communication functionality based on the second information. For example, the second apparatus 120 such as the UE vendors may use the received information such as the training data to train their real encoder. This real encoder will be deployed in the DUT.

In some example embodiments, the first apparatus 110 may add the first outcome of the updated reference encoder and the second outcome of the updated reference decoder into the reference data set. In this way, the reference data set can be updated.

By using the feedback process 340, the reference data sets can be shared with stake holders to help them improve over time. The stake holders can also help to improve the reference decoder or the reference encoder by collaborating and sharing the data sets.

In some example embodiments, the first apparatus 110 may transmit (352), to the fourth apparatus 301, at least one of a first set of parameters of the updated reference encoder or a second set of parameters of the updated reference decoder. The fourth apparatus 301 may receive (354) at least one of the first set of parameters of the updated reference encoder or the second set of parameters of the updated reference decoder.

It is to be understood that the feedback process 340 or the feedback phase need not happen immediately after the updating or training process 330. It is shown after the updating or training process 330 only for purpose of illustration. The feedback process 340 may happen in the background, too. The data set exchange between the first apparatus 110 and other apparatuses and various state holders may happen at any suitable time intervals.

In some example embodiments, the signaling chart 300 may further include a testing process 360. In the testing process 360, the first apparatus 110 may test (378) a target encoder of the communication functionality of the second apparatus 120 based on the updated reference decoder. In some example embodiments, the target encoder or real encoder that is designed based on pre-agreed or specified principles of the reference decoder is available at the second apparatus 120. The updated reference decoder may cater to different encoders.

The second apparatus 120 may deploy (362) the target encoder. For example, the second apparatus 120 may deploy (364) the target encoder in the DUT. The first apparatus 110 may deploy (364) the updated reference decoder. The first apparatus 110 may deploy (364) the updated reference decoder as part of the test process 360.

By way of example, the first apparatus 110 may transmit (366) input data to the second apparatus 120. The second apparatus 120 may receive (368) the input data. The second apparatus 120 may generate (370) a third outcome by the target encoder of the communication functionality with the input data.

The second apparatus 120 may transmit (372) the third outcome to the first apparatus 110. The first apparatus 110 may receive (374) the third outcome. The first apparatus 110 may generate (376) a fourth outcome by using the updated reference decoder of the communication functionality with the third outcome. The first apparatus 110 may test (378) the target encoder, for example determine a test result of the target encoder, based on the fourth outcome. The first apparatus 110 may report (380) the test result.

Taking the CSI feedback as an example of the communication functionality, the first apparatus 110 may transmit channel state information reference signal (CSI RS) as the input data to the second apparatus 120 for channel estimation at DUT. The second apparatus 120 may use the target encoder to encode the CSI feedback. The first apparatus 110 may receive the encoded CSI feedback (that is, the third outcome). The first apparatus 110 may use the updated reference decoder to reconstruct the CSI feedback from the encoded CSI feedback. Based on the reconstructed CSI feedback (that is, the fourth outcome), the first apparatus 110 may proceed with the test. Once the test is completed, the first apparatus 110 may report the test results.

Example embodiments regarding testing the target encoder of the second apparatus 120 based on the updated reference decoder have been described. It is to be understood that in some example embodiments, the reference encoder may also be used for testing a target decoder of the communication functionality of the third apparatus 130. The process of testing the target decoder of the third apparatus 130 as a DUT is similar to the testing process 360, which will not be repeated here.

It is to be understood that the example training mechanism used to illustrate the signaling chart is Type 3 training, where NW first training is applied. However, the signaling chart be easily adapted to other different training methods with mutual agreement with the stakeholders. Scope of the present disclosure is not limited in this regard.

By using the signaling chart 300, the target encoder and/or the target decoder of the communication functionality can be well trained or tested. Thus, the performance of the communication functionality can be improved. In addition, the reference decoder is designed, trained, and deployed that can cater to different encoders designed by individual UE vendors. Likewise, the reference encoder may be designed, trained, and deployed that can cater to different decoders designed by individual NW vendors. In this way, the UE and NW vendors need not to share the details of their encoder or decoder design.

Several example embodiments for two-sided model-based communication functionality have been described with respect to FIG. 3. To better understand the solution of the present disclosure, further example embodiments are now described with FIG. 4, which illustrates an example framework 400 for training and testing two-sided model for the communication functionality according to some example embodiments of the present disclosure.

The framework 400 may be applicable for any suitable AI/ML use cases or any suitable communication functionalities. In the following, some example embodiments are described by taking the CSI feedback as an example. However, it is to be understood that this is merely an example without any limitation, and the concept described with respect the CSI feedback may be applied to another AI/ML based communication functionalities or use cases.

As illustrated, a data repository 410 is deployed in the framework 400. The data repository 410 may store reference data (or training data) from various sources, including but not limited to one or more terminal devices 412, one or more network devices 414 and one or more TEs 416.

The reference data may be both real field data and data synthesized using simulated environments. The content of this data set may be agreed between the sources listed above. In addition, the content of the data set may also be fully or partially specified by 3GPP or any other standardization bodies.

In some example embodiments, a training framework 420 and a testing framework 430 may be implemented at the first apparatus 110. In the training framework 420, models for example encoders and decoders used in the test framework 430 may be created and/or updated. For example, at block 422, a hypothetical encoder is created and/or updated. It is to be noted that the hypothetical encoder is not the actual encoder that is used by the vendors, hence the name hypothetical encoder. This is used in the framework to mitigate the requirement of an actual encoder used at the DUT which the UE vendors might not want to share.

At block 424, the hypothetical Encoder is used to generate inference of the communication functionality such as to generate hypothetical CSI feedback 426, to serve as a training dataset together with synthetic target CSI, which may be very close to the real encoded CSI feedback.

At block 428, a reference decoder is created or updated. For example, the reference decoder may be created or updated based on the hypothetical CSI feedback 426 from hypothetical encoder along with the synthetic target CSI (it is synthetic as the data is not directly based on the real-world data but something that is derived out of the various data sets from various sources). It is to be understood that the design and the characteristics of the reference decoder may also be fully or partially specified by the 3GPP or any other standardization bodies.

In some example embodiments, the training set used to train and generate hypothetical encoder and the hypothetical CSI feedback may be shared with the UE vendors to improve their encoders. The training set used to train and generate reference decoder and the reconstructed CSI feedback may be shared with the NW and TE vendors to improve their decoders and reference decoders.

In the testing framework 430, the reference decoder such as the created or updated reference decoder may be used by the first apparatus 110 to test against different encoders that are tested in the DUT. The source of the encoders are the UE vendors. For example, once trained or generated, the reference decoder will be deployed in the first apparatus 110 for testing against the encoders in the DUT. For example, at block 432, the reference decoder is deployed.

In the testing framework, at block 440, the second apparatus 120 such as UE vendor(s) may use the synthetic target CSI dataset along with the output of hypothetical encoder to train real encoder(s) at its or their end(s). Alternatively, or in addition, the second apparatus 120 may use real-world CSI feedback data along with the synthetic CSI data to train the real encoder(s). The real encoder 450 may be deployed in the DUT such as the second apparatus 120 for testing against the reference decoder.

To test the functionality with two sided models, the first apparatus 110 may be deployed with the created or updated reference decoder. The second apparatus 120 is deployed with the real encoder by the UE vendor. The CSI feedback that is encoded by the real encoder 450 may be decoded with the reference decoder and the performance can be compared and reported. For example, an encoded CSI feedback 444 may be generated by the real encoder 450 based on a target CSI 442. The reference decoder may generate reconstructed CSI feedback 436 based on the encoded CSI feedback 444. The performance of the real encoder 450 thus can be compared and reported. For example, at block 438, the first apparatus 110 may perform test reporting, such as report the test results.

In some example embodiments, initially the hypothetical encoder might not be closer to reality, but periodically as and when the UE vendors update the data repository with real data the hypothetical encoder can move closer to a real encoder helping both the UE and the Network Vendors.

Alternatively, in some example embodiments, this potential issue can be alleviated by introducing reference target CSI dataset which UE-vendors may need to align. Reference target CSI dataset may be specific enough to reflect UE device-specific variants, whereas should be generic enough to represent common input CSI over multiple involved UE vendors and their multiple chipsets/models. Hence there is a trade-off.

Example embodiments regarding testing the real encoder of the UE vendor based on the reference decoder have been described. It is to be understood that in some example embodiments, a reference encoder may also be used for testing a real decoder of the communication functionality of a network device as the DUT.

It is to be understood that the example training mechanism used to illustrate the signaling chart is Type 3 training, where NW first training is applied. However, the signaling chart can be easily adapted to other different training methods with mutual agreement with the stakeholders. Scope of the present disclosure is not limited in this regard.

With the framework 400, the real encoder of the UE vendors can be better trained and tested. In this way, the communication functionality can be improved.

Figure 4:
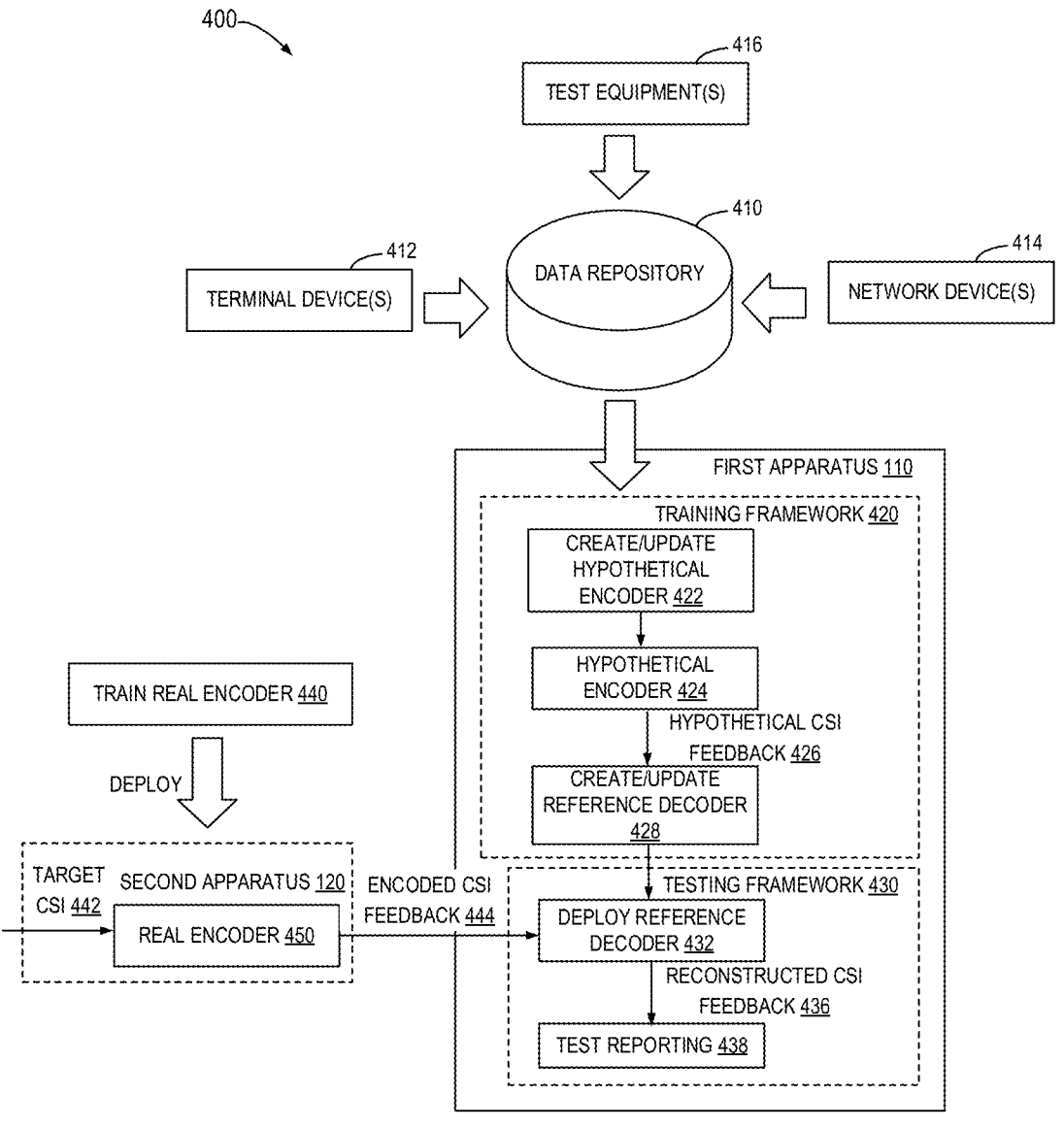
FIG. 4 illustrates an example framework for training and testing two-sided model for the communication functionality according to some example embodiments of the present disclosure.

Several example embodiments have been described with respect to FIG. 3 to FIG. 4. It is to be understood that these example embodiments can be used in any suitable combination, or used separately. It is to be noted that FIG. 3 to FIG. 4 illustrate the communication functionality of CSI feedback or CSI compression as an example. The concept described above may be applicable to other communication functionalities or use cases.

FIG. 5 shows a flowchart of an example method 500 implemented at a first apparatus in accordance with some example embodiments of the present disclosure. For the purpose of discussion, the method 500 will be described from the perspective of the first apparatus 110 in FIG. 1.

At block 510, the first apparatus 110 obtains a reference data set of a communication functionality, the reference data set including reference data associated with a plurality of terminal devices, a plurality of network devices and at least one test equipment.

At block 520, the first apparatus 110 updates a reference encoder of the communication functionality based on at least the reference data. At block 530, the first apparatus 110 updates a reference decoder of the communication functionality based on at least the reference data. At least one of the updated reference encoder or the updated reference decoder is used for optimization of the communication functionality by a further apparatus.

In some example embodiments, the method 500 further comprises: creating at least one of the reference encoder or the reference decoder based on at least the reference data.

In some example embodiments, the method 500 further comprises: obtaining a first outcome of the updated reference encoder of the communication functionality with the reference data; and updating the reference decoder of the communication functionality based on the first outcome and the reference data.

In some example embodiments, the method 500 further comprises: transmitting, to a second apparatus, first information for updating a target encoder of the communication functionality, the first information including at least one of: the reference data, the first outcome, or a first set of parameters of the updated reference encoder.

In some example embodiments, the method 500 further comprises: transmitting, to a third apparatus, second information for updating a target decoder of the communication functionality, the second information including at least one of: the reference data, a second outcome of the updated reference decoder of the communication functionality with the first outcome, or a second set of parameters of the updated reference decoder.

In some example embodiments, the method 500 further comprises: adding the first outcome and the second outcome into the reference data set.

In some example embodiments, the method 500 further comprises: testing a target encoder of the communication functionality of the second apparatus based on the updated reference decoder.

In some example embodiments, the method 500 further comprises: transmitting, to the second apparatus, input data; receiving, from the second apparatus, a third outcome generated by a target encoder of the communication functionality of the second apparatus with the input data; generating a fourth outcome by using the updated reference decoder of the communication functionality with the third outcome; and determining a test result of the target encoder based on the fourth outcome.

In some example embodiments, the method 500 further comprises: transmitting, to a fourth apparatus, at least one of a first set of parameters of the updated reference encoder or a second set of parameters of the updated reference decoder.

In some example embodiments, the method 500 further comprises: receiving, from a fourth apparatus, at least one of a first set of parameters of the reference encoder or a second set of parameters of the reference decoder.

FIG. 6 shows a flowchart of an example method 600 implemented at a second apparatus in accordance with some example embodiments of the present disclosure. For the purpose of discussion, the method 600 will be described from the perspective of the second apparatus 120 in FIG. 1.

At block 610, the second apparatus 120 receives, from a first apparatus, information for updating a target encoder of a communication functionality. The information includes at least one of: reference data of the communication functionality, an outcome of a reference encoder of the communication functionality of the first apparatus with the reference data, or a set of parameters of the reference encoder. At block 620, the second apparatus 120 updates the target encoder based on the information.

FIG. 7 shows a flowchart of an example method 700 implemented at a third apparatus in accordance with some example embodiments of the present disclosure. For the purpose of discussion, the method 700 will be described from the perspective of the third apparatus 130 in FIG. 1.

At block 710, the third apparatus 130 receives, from a first apparatus, information for updating a target decoder of a communication functionality. The information includes at least one of: reference data of the communication functionality, a second outcome of a reference decoder of the communication functionality of the first apparatus with a first outcome of an encoder of the communication functionality, or a set of parameters of the reference decoder. At block 720, the third apparatus 130 updates the target decoder based on the information.

In some example embodiments, a first apparatus capable of performing any of the method 500 (for example, the first apparatus 110 in FIG. 1) may comprise means for performing the respective operations of the method 500. The means may be implemented in any suitable form. For example, the means may be implemented in a circuitry or software module. The first apparatus may be implemented as or included in the first apparatus 110 in FIG. 1.

In some example embodiments, the first apparatus comprises means for obtaining a reference data set of a communication functionality, the reference data set including reference data associated with a plurality of terminal devices, a plurality of network devices and at least one test equipment; means for updating a reference encoder of the communication functionality based on at least the reference data; and means for updating a reference decoder of the communication functionality based on at least the reference data, wherein at least one of the updated reference encoder or the updated reference decoder is used for optimization of the communication functionality by a further apparatus.

In some example embodiments, the first apparatus further comprises: means for creating at least one of the reference encoder or the reference decoder based on at least the reference data.

In some example embodiments, the first apparatus further comprises: means for obtaining a first outcome of the updated reference encoder of the communication functionality with the reference data; and means for updating the reference decoder of the communication functionality based on the first outcome and the reference data.

In some example embodiments, the first apparatus further comprises: means for transmitting, to a second apparatus, first information for updating a target encoder of the communication functionality, the first information including at least one of: the reference data, the first outcome, or a first set of parameters of the updated reference encoder.

In some example embodiments, the first apparatus further comprises: means for transmitting, to a third apparatus, second information for updating a target decoder of the communication functionality, the second information including at least one of: the reference data, a second outcome of the updated reference decoder of the communication functionality with the first outcome, or a second set of parameters of the updated reference decoder.

In some example embodiments, the first apparatus further comprises: adding the first outcome and the second outcome into the reference data set.

In some example embodiments, the first apparatus further comprises: means for testing a target encoder of the communication functionality of the second apparatus based on the updated reference decoder.

In some example embodiments, the first apparatus further comprises: means for transmitting, to the second apparatus, input data; means for receiving, from the second apparatus, a third outcome generated by a target encoder of the communication functionality of the second apparatus with the input data; means for generating a fourth outcome by using the updated reference decoder of the communication functionality with the third outcome; and means for determining a test result of the target encoder based on the fourth outcome.

In some example embodiments, the first apparatus further comprises: means for transmitting, to a fourth apparatus, at least one of a first set of parameters of the updated reference encoder or a second set of parameters of the updated reference decoder.

In some example embodiments, the first apparatus further comprises: means for receiving, from a fourth apparatus, at least one of a first set of parameters of the reference encoder or a second set of parameters of the reference decoder.

In some example embodiments, the first apparatus further comprises means for performing other operations in some example embodiments of the method 500 or the first apparatus 110. In some example embodiments, the means comprises at least one processor; and at least one memory storing instructions that, when executed by the at least one processor, cause the performance of the first apparatus.

In some example embodiments, a second apparatus capable of performing any of the method 600 (for example, the second apparatus 120 in FIG. 1) may comprise means for performing the respective operations of the method 600. The means may be implemented in any suitable form. For example, the means may be implemented in a circuitry or software module. The second apparatus may be implemented as or included in the second apparatus 120 in FIG. 1.

In some example embodiments, the second apparatus comprises means for receiving, from a first apparatus, information for updating a target encoder of a communication functionality, the information including at least one of: reference data of the communication functionality, an outcome of a reference encoder of the communication functionality of the first apparatus with the reference data, or a set of parameters of the reference encoder; and means for updating the target encoder based on the information.

In some example embodiments, the second apparatus further comprises means for performing other operations in some example embodiments of the method 600 or the second apparatus 120. In some example embodiments, the means comprises at least one processor; and at least one memory storing instructions that, when executed by the at least one processor, cause the performance of the second apparatus.

In some example embodiments, a third apparatus capable of performing any of the method 700 (for example, the third apparatus 130 in FIG. 1) may comprise means for performing the respective operations of the method 700. The means may be implemented in any suitable form. For example, the means may be implemented in a circuitry or software module. The third apparatus may be implemented as or included in the third apparatus 130 in FIG. 1.

In some example embodiments, the third apparatus comprises means for receiving, from a first apparatus, information for updating a target decoder of a communication functionality, the information including at least one of: reference data of the communication functionality, a second outcome of a reference decoder of the communication functionality of the first apparatus with a first outcome of an encoder of the communication functionality, or a set of parameters of the reference decoder; and means for updating the target decoder based on the information.

In some example embodiments, the third apparatus further comprises means for performing other operations in some example embodiments of the method 700 or the third apparatus 130. In some example embodiments, the means comprises at least one processor; and at least one memory storing instructions that, when executed by the at least one processor, cause the performance of the third apparatus.

FIG. 8 is a simplified block diagram of a device 800 that is suitable for implementing example embodiments of the present disclosure. The device 800 may be provided to implement a communication device, for example, the first apparatus 110 or the second apparatus 120 or the third apparatus 130 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has one or more communication interfaces to facilitate communication with one or more other modules or devices. The communication interfaces may represent any interface that is necessary for communication with other network elements. In some example embodiments, the communication module 840 may include at least one antenna.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The instructions of the program 830 may include instructions for performing operations/acts of some example embodiments of the present disclosure. The program 830 may be stored in the memory, e.g., the ROM 824. The processor 810 may perform any suitable actions and processing by loading the program 830 into the RAM 822.

The example embodiments of the present disclosure may be implemented by means of the program 830 so that the device 800 may perform any process of the disclosure as discussed with reference to FIG. 3 to FIG. 7. The example embodiments of the present disclosure may also be implemented by hardware or by a combination of software and hardware.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 9:
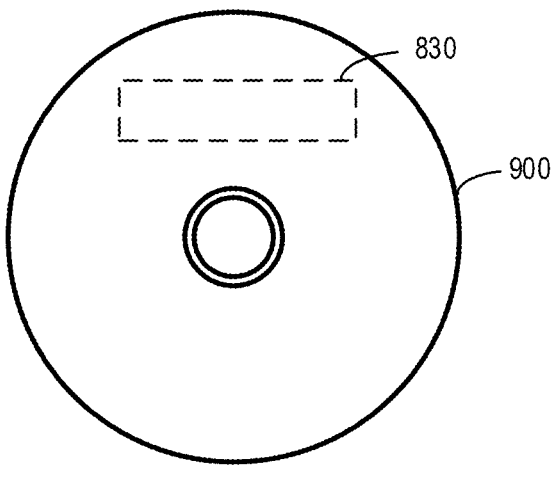
FIG. 9 illustrates a block diagram of an example computer readable medium in accordance with some example embodiments of the present disclosure.

FIG. 9 shows an example of the computer readable medium 900 which may be in form of CD, DVD or other optical storage disk. The computer readable medium 900 has the program 830 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

We claim:

1. A first apparatus comprising:

at least one processor; and at least one memory storing instructions that, when executed by the at least one processor, cause the first apparatus to:

obtain a reference data set of a communication functionality, the reference data set including reference data associated with a plurality of terminal devices, a plurality of network devices and at least one test equipment;

update a reference encoder of the communication functionality based on at least the reference data;

update a reference decoder of the communication functionality based on at least the reference data;

obtain a first outcome of the updated reference encoder of the communication functionality with the reference data;

update the reference decoder of the communication functionality based on the first outcome and the reference data;

transmit, to a second apparatus, first information for updating a target encoder of the communication functionality, the first information including: the reference data, the first outcome, and a first set of parameters of the updated reference encoder;

transmit, to a third apparatus, second information for updating a target decoder of the communication functionality, the second information including: the reference data, a second outcome of the updated reference decoder of the communication functionality with the first outcome, and a second set of parameters of the updated reference decoder;

add the first outcome and the second outcome into the reference data set;

test a target encoder of the communication functionality of the second apparatus based on the updated reference decoder;

transmit input data to the second apparatus;

receive, from the second apparatus, a third outcome generated by a target encoder of the communication functionality of the second apparatus with the input data;

generate a fourth outcome by using the updated reference decoder of the communication functionality with the third outcome; and determine a test result of the target encoder based on the fourth outcome.

2. The first apparatus of claim 1, wherein the first apparatus is caused to:

create the reference encoder based on at least the reference data.

3. The first apparatus of claim 2, wherein the first apparatus is caused to:

Create the reference decoder based on at least the reference data.

4. The first apparatus of claim 3, wherein the reference encoder and the reference decoder are created based further on synthetic data associated with the reference data.

5. The first apparatus of claim 4, wherein the first apparatus is caused to:

transmit, to the fourth apparatus, at least one of a first set of parameters of the updated reference encoder or a second set of parameters of the updated reference decoder.

6. The first apparatus of claim 5, wherein the first apparatus is caused to:

receive, from the fourth apparatus, at least one of a first set of parameters of the reference encoder or a second set of parameters of the reference decoder.

7. The first apparatus of claim 6, wherein at least one of the updated reference encoder or the updated reference decoder is used for optimization of the communication functionality by a further apparatus.

8. A system comprising:

a first apparatus;

at least one processor; and at least one memory storing instructions that, when executed by the at least one processor, cause the first apparatus to:

obtain a reference data set of a communication functionality, the reference data set including reference data associated with a plurality of terminal devices, a plurality of network devices and at least one test equipment;

update a reference encoder of the communication functionality based on at least the reference data;

update a reference decoder of the communication functionality based on at least the reference data;

obtain a first outcome of the updated reference encoder of the communication functionality with the reference data;

update the reference decoder of the communication functionality based on the first outcome and the reference data;

transmit, to a second apparatus, first information for updating a target encoder of the communication functionality, the first information including: the reference data, the first outcome, and a first set of parameters of the updated reference encoder;

transmit, to a third apparatus, second information for updating a target decoder of the communication functionality, the second information including: the reference data, a second outcome of the updated reference decoder of the communication functionality with the first outcome, and a second set of parameters of the updated reference decoder;

add the first outcome and the second outcome into the reference data set;

test a target encoder of the communication functionality of the second apparatus based on the updated reference decoder;

transmit input data to the second apparatus;

receive, from the second apparatus, a third outcome generated by a target encoder of the communication functionality of the second apparatus with the input data;

generate a fourth outcome by using the updated reference decoder of the communication functionality with the third outcome; and determine a test result of the target encoder based on the fourth outcome.

9. The system of claim 8, wherein the first apparatus is caused to:

create the reference encoder based on at least the reference data.

10. The system of claim 9, wherein the first apparatus is caused to:

Create the reference decoder based on at least the reference data.

11. The system of claim 10, wherein the reference encoder and the reference decoder are created based further on synthetic data associated with the reference data.

12. The system of claim 11, wherein the first apparatus is caused to:

transmit, to the fourth apparatus, at least one of a first set of parameters of the updated reference encoder or a second set of parameters of the updated reference decoder.

13. The system of claim 12, wherein the first apparatus is caused to:

receive, from the fourth apparatus, at least one of a first set of parameters of the reference encoder or a second set of parameters of the reference decoder.

14. The system of claim 13, wherein at least one of the updated reference encoder or the updated reference decoder is used for optimization of the communication functionality by a further apparatus.

15. A method comprising:

obtaining, by a first apparatus, a reference data set of a communication functionality, the reference data set including reference data associated with a plurality of terminal devices, a plurality of network devices and at least one test equipment;

updating a reference encoder of the communication functionality based on at least the reference data;

updating a reference decoder of the communication functionality based on at least the reference data;

obtaining a first outcome of the updated reference encoder of the communication functionality with the reference data;

updating the reference decoder of the communication functionality based on the first outcome and the reference data;

transmitting, to a second apparatus, first information for updating a target encoder of the communication functionality, the first information including: the reference data, the first outcome, and a first set of parameters of the updated reference encoder;

transmitting, to a third apparatus, second information for updating a target decoder of the communication functionality, the second information including: the reference data, a second outcome of the updated reference decoder of the communication functionality with the first outcome, and a second set of parameters of the updated reference decoder;

adding the first outcome and the second outcome into the reference data set;

testing a target encoder of the communication functionality of the second apparatus based on the updated reference decoder;

transmit input data to the second apparatus;

receiving, from the second apparatus, a third outcome generated by a target encoder of the communication functionality of the second apparatus with the input data;

generating a fourth outcome by using the updated reference decoder of the communication functionality with the third outcome; and determining a test result of the target encoder based on the fourth outcome.

16. The method of claim 15, further comprising:

creating the reference encoder based on at least the reference data.

17. The method of claim 16, further comprising:

creating the reference decoder based on at least the reference data.

18. The method of claim 17, wherein the reference encoder and the reference decoder are created based further on synthetic data associated with the reference data.

19. The method of claim 18, further comprising:

transmitting, to the fourth apparatus, at least one of a first set of parameters of the updated reference encoder or a second set of parameters of the updated reference decoder; and receiving, from the fourth apparatus, at least one of a first set of parameters of the reference encoder or a second set of parameters of the reference decoder.

20. The method of claim 19, wherein at least one of the updated reference encoder or the updated reference decoder is used for optimization of the communication functionality by a further apparatus.

* * * * *